(12) United States Patent
Huang et al.

(10) Patent No.: US 12,277,679 B2
(45) Date of Patent: Apr. 15, 2025

(54) METHODS FOR ENHANCING RESOLUTION AND REDUCING NOISE IN MULTI-FRAME IMAGES

(71) Applicant: Black Sesame Technologies Inc., San Jose, CA (US)

(72) Inventors: Dezhao Huang, Singapore (SG); Yubo Duan, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 312 days.

(21) Appl. No.: 17/743,888

(22) Filed: May 13, 2022

(65) Prior Publication Data
US 2023/0368347 A1    Nov. 16, 2023

(51) Int. Cl.
*G06T 5/50* (2006.01)
*G06T 3/40* (2024.01)
*G06T 5/70* (2024.01)
*G06T 5/73* (2024.01)
*G06T 7/30* (2017.01)

(52) U.S. Cl.
CPC ............... *G06T 5/50* (2013.01); *G06T 3/40* (2013.01); *G06T 5/70* (2024.01); *G06T 5/73* (2024.01); *G06T 7/30* (2017.01); *G06T 2207/10016* (2013.01); *G06T 2207/20221* (2013.01)

(58) Field of Classification Search
CPC .... G06T 5/50; G06T 7/30; G06T 5/73; G06T 5/70; G06T 3/40; G06T 2207/10016; G06T 2207/20221
See application file for complete search history.

(56) References Cited

U.S. PATENT DOCUMENTS

| | | | | |
|---|---|---|---|---|
| 8,330,827 B2* | 12/2012 | Wang | ................... | G06T 3/4076 348/241 |
| 9,449,374 B2* | 9/2016 | Nash | ................... | H04N 23/80 |
| 10,719,927 B2* | 7/2020 | Bala | ................... | G06T 5/60 |
| 10,909,380 B2* | 2/2021 | He | ................... | G06V 20/48 |
| 10,984,545 B2* | 4/2021 | Gu | ................... | G06N 20/10 |
| 11,128,809 B2* | 9/2021 | Zhen | ................... | H04N 23/6811 |
| 11,210,805 B2* | 12/2021 | Bao | ................... | G06T 7/593 |
| 11,250,549 B2* | 2/2022 | Wang | ................... | G06T 5/94 |
| 11,803,949 B2* | 10/2023 | Smirnov | ................... | G06T 5/70 |

* cited by examiner

*Primary Examiner* — Gregory M Desire
(74) *Attorney, Agent, or Firm* — Morgan, Lewis & Bockius LLP

(57) ABSTRACT

A method performed by an electronic device with one or more processors and memory includes receiving a plurality of frames of an image; selecting one frame of the plurality of frames as a main frame thereby leaving the rest of the plurality of frames as reference frames; aligning the reference frames with the main frame; determining fusion weights for a respective reference frame of the reference frames by comparing the main frame and the respective reference frame; and obtaining a weighted combination of the main frame and the reference frames based on the fusion weights. An electronic device configured for performing the method and a computer readable storage medium storing instructions for performing the method are also disclosed.

20 Claims, 7 Drawing Sheets

METHODS FOR ENHANCING RESOLUTION AND REDUCING NOISE IN MULTI-FRAME IMAGES

TECHNICAL FIELD

The disclosed implementations relate generally to methods for image processing, and more specifically to devices and methods for image processing to enhance resolution and reducing noise in a multi-frame image.

BACKGROUND

Digital cameras, which have gained popularity in recent years, typically include an array of optical sensors (e.g., charge-coupled device (CCD) sensors or complementary metal-oxide semiconductor (CMOS) sensors). Hardware components, such as the optical sensors, often define the performance of such digital cameras, such as resolutions and signal-to-noise ratios.

As the demand for higher quality images continues to increase, sensor or camera modules with enhanced hardware characteristics are increasingly used.

SUMMARY

In addition to, or instead of, utilizing camera modules with enhanced performance specifications, image processing operations may be used to enhance the resolution and/or signal-to-noise ratio of images obtained using a particular camera device. Such operations may be used with camera modules with low performance specifications to provide image quality that would be otherwise available from camera modules with high performance specification. Such operations may also be used with camera modules with high performance specifications to provide images of enhanced qualities (e.g., higher resolutions and/or lower signal-to-noise ratios). However, certain image processing operations may require significant computational resources and as a result, may be slow.

Accordingly, there is a need for methods and devices that can enhance resolutions and/or signal-to-noise ratios in an image. The methods and devices described herein address the needs. Furthermore, the methods and devices described herein may enable computationally efficient and fast image processing operations in providing images with enhanced resolution and signal-to-noise ratios.

In accordance with some implementations, a method is performed at an electronic device with one or more processors and memory. The method includes receiving a plurality of frames of an image; selecting one frame of the plurality of frames as a main frame thereby leaving the rest of the plurality of frames as reference frames; aligning the reference frames with the main frame; determining fusion weights for a respective reference frame of the reference frames by comparing the main frame and the respective reference frame; and obtaining a weighted combination of the main frame and the reference frames based on the fusion weights.

In accordance with some implementations, an electronic device includes one or more processors and memory storing instructions, which, when executed by the one or more processors, cause the one or more processors to: receive a plurality of frames of an image; select one frame of the plurality of frames as a main frame thereby leaving the rest of the plurality of frames as reference frames; align the reference frames with the main frame; determine fusion weights for a respective reference frame of the reference frames by comparing the main frame and the respective reference frame; and obtain a weighted combination of the main frame and the reference frames based on the fusion weights.

In some implementations, the stored instructions, when executed by the one or more processors, also cause the one or more processors to sharpen the plurality of frames prior to selecting the one frame.

In some implementations, the stored instructions, when executed by the one or more processors, also cause the one or more processors to upscale the reference frames.

In some implementations, the stored instructions, when executed by the one or more processors, also cause the one or more processors to upscale the main frame.

In some implementations, determining the fusion weights for the respective reference frame includes determining fusion weights for respective pixels.

In some implementations, the stored instructions, when executed by the one or more processors, also cause the one or more processors to upscale the weighted combination.

In some implementations, upscaling the weighted combination includes applying an adaptive anisotropic triangular kernel on the weighted combination to obtain an upscaled image.

In accordance with some implementations, a computer readable storage medium stores one or more programs for execution by one or more processors of an electronic device. The one or more programs include instructions for receiving a plurality of frames of an image; selecting one frame of the plurality of frames as a main frame thereby leaving the rest of the plurality of frames as reference frames; aligning the reference frames with the main frame; determining fusion weights for a respective reference frame of the reference frames by comparing the main frame and the respective reference frame; and obtaining a weighted combination of the main frame and the reference frames based on the fusion weights.

Thus, the methods and devices described utilize operations in such ways that reduce memory consumption and reduce computational complexity, which in turn reduces power consumption, increases the processing speed, and enhances battery life. Such methods and devices may replace conventional methods and devices for image collection and/or processing. Alternatively, such methods and devices may complement conventional methods and devices for image collection and/or processing.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

These figures are not drawn to scale unless indicated otherwise.

DETAILED DESCRIPTION

Reference will be made to implementations, examples of which are illustrated in the accompanying drawings. In the following description, numerous specific details are set forth in order to provide a thorough understanding of the various described implementations. However, it will be apparent to one of ordinary skill in the art that the various described implementations may be practiced without these particular details. In other instances, methods, procedures, components, circuits, and networks that are well-known to those of ordinary skill in the art are not described in detail so as not to unnecessarily obscure aspects of the implementations.

Figure 1:
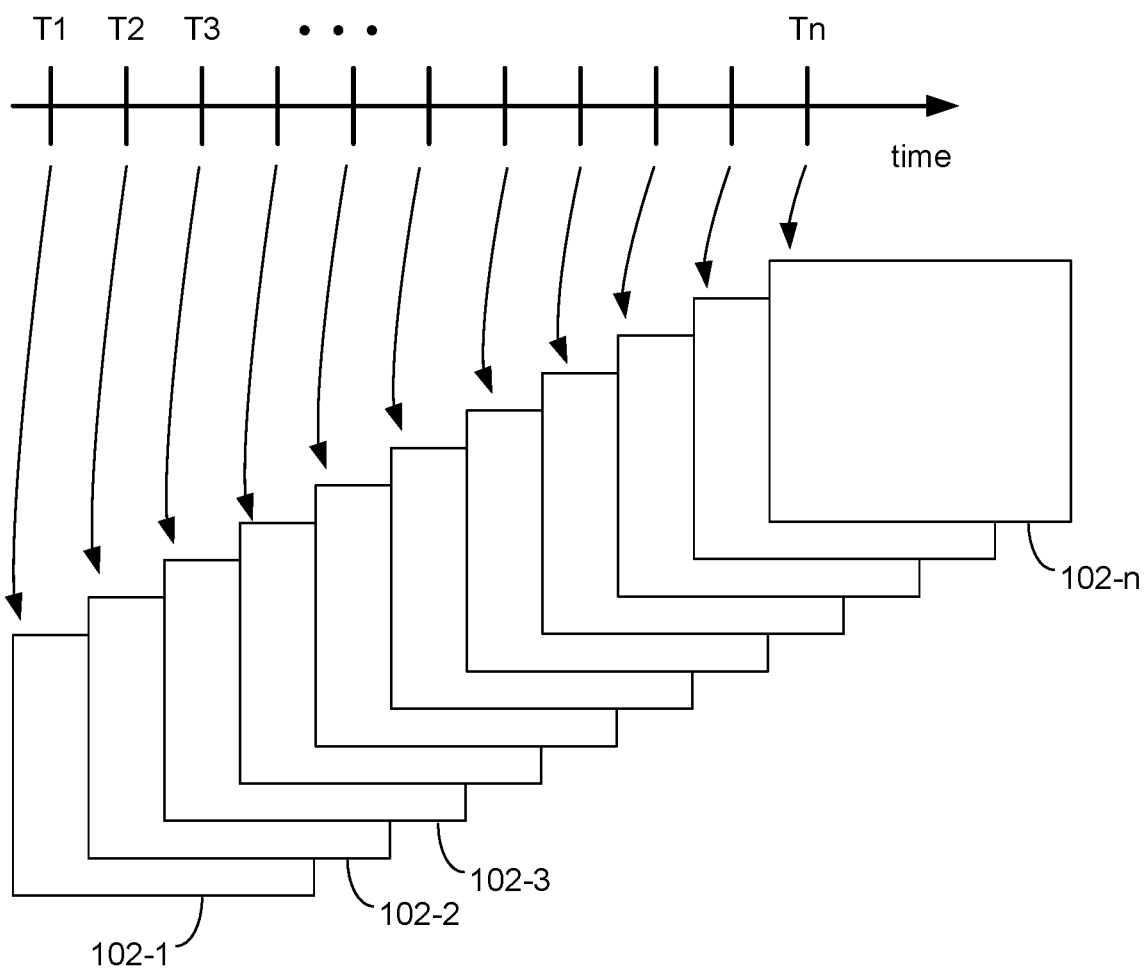
FIG. 1 illustrates multiple frames of an image in accordance with some implementations.

FIG. 1 illustrates multiple frames of an image in accordance with some implementations.

As described herein, multiple frames of an image (also called a plurality of frames of an image) refers to a set of two or more images that are collected consecutively by an imaging device (e.g., a camera or a camera module). As shown in FIG. 1, the multiple frames include frame 102-1 collected at time T1, frame 102-2 collected at time T2 (which is subsequent to T1), and frame 102-3 collected at time T3 (which is subsequent to T2), through frame 102-$n$ collected at time Tn (which is subsequent to T3 and time points when frames between frame 102-3 and 102-$n$ were collected).

The multiple frames of an image are typically collected over a short period of time (e.g., less than 1 second). For example, the difference between Tn and T1 may be less than 1 second.

In some implementations, the multiple frames are collected at a same interval (in which case the multiple frames are called synchronous frames). For example, the multiple frames may be collected at 0.1 second interval. In some implementations, the multiple frames are collected at a non-uniform interval (in which case the multiple frames are called asynchronous frames). For example, the multiple frames may be collected at an interval alternating between 0.1 seconds and 0.2 seconds. In another example, the multiple frames may be collected at random or pseudo-random intervals.

In some cases, each of the multiple frames of an image contains an image of a common object (e.g., a person), or a portion thereof. In some cases, at least a majority of the multiple frames of an image contains an image of a common object (e.g., a person), or a portion thereof.

Figure 2:
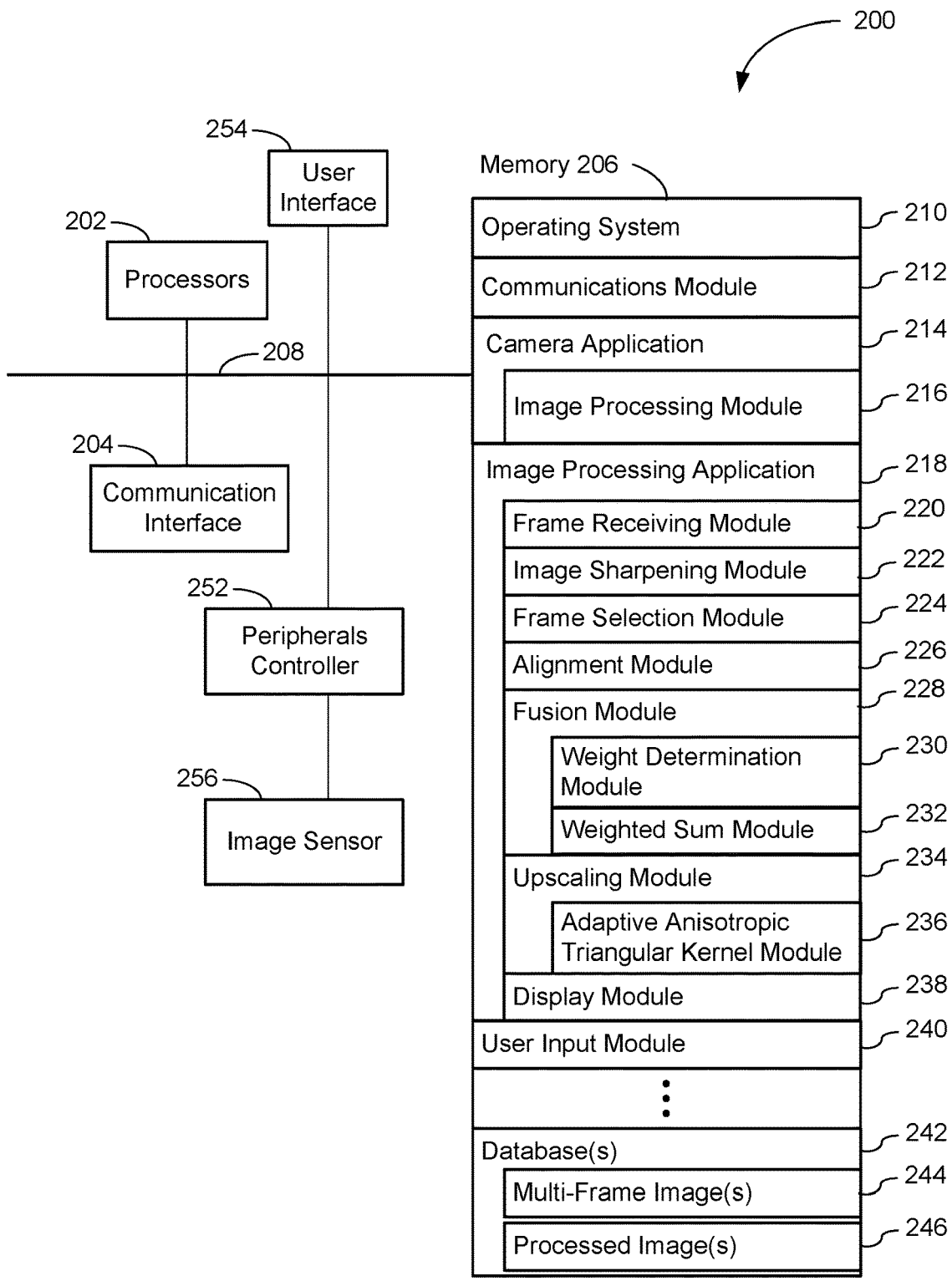
FIG. 2 is a block diagram illustrating electronic components in accordance with some implementations.

FIG. 2 is a block diagram illustrating electronic components of an electronic device 200 in accordance with some implementations. Electronic device 200 includes one or more processing units 202 (central processing units, application processing units, application-specific integrated circuit, etc., which are also called herein processors), one or more network or other communications interfaces 204, memory 206, and one or more communication buses 208 for interconnecting these components. In some implementations, communication buses 208 include circuitry (sometimes called a chipset) that interconnects and controls communications between system components. In some implementations, system 100 includes a user interface 254 (e.g., a user interface having a display device, which can be used for displaying one or more acquired images or a processed image, one or more buttons, and/or other input devices). In some implementations, electronic device 200 also includes peripherals controller 252, which is configured to control operations of sensors and/or actuators, such as an image sensor 256 (e.g., an array of optical sensors) for collecting an image or multiple frames of an image.

In some implementations, communications interfaces 204 include wired communications interfaces and/or wireless communications interfaces (e.g., Wi-Fi, Bluetooth, etc.).

Memory 206 of electronic device 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processors 202. Memory 206, or alternately the non-volatile memory device(s) within memory 206, comprises a computer readable storage medium (which includes a non-transitory computer readable storage medium and/or a transitory computer readable storage medium). In some implementations, memory 206 includes a removable storage device (e.g., Secure Digital memory card, Universal Serial Bus memory device, etc.). In some implementations, memory 206 or the computer readable storage medium of memory 206 stores the following programs, modules and data structures, or a subset thereof:

operating system 210 that includes procedures for handling various basic system services and for performing hardware dependent tasks;

network communication module (or instructions) 212 that is used for connecting electronic device 200 to other electronic devices (e.g., computers, such as clients and/or servers) via one or more communications interfaces 204 and one or more communications networks, such as the Internet, other wide area networks, local area networks, metropolitan area networks, and so on;

camera application 214 that controls operations of the image sensor 256 and collects information indicating one or more images collected by the image sensor 256 from the image sensor 256 (e.g., via the peripherals controller 252);

image processing application 218 that processes one or more images (or one or more frames of an image) (e.g., enhancing the resolution and signal-to-noise ratios);

user input module 240 configured for handling user inputs on electronic device 200 (e.g., pressing of buttons on electronic device 200 or pressing of buttons on a user interface, such as a keyboard, mouse, or touch-sensitive display, that is in communication with electronic device 200 or directly located on electronic device 200); and one or more databases 242 that store images, such as multi-frame images 244 and processed images 246.

In some implementations, the image processing application 218 is implemented as an image processing module 216 used by the camera application 214 (e.g., the image processing module 216 is included in, or initiated by, the camera application 214).

In some implementations, image processing application 218, or image processing module 216, includes the following programs, modules, and data structures, or a subset or superset thereof:

frame receiving module 220 configured for receiving multiple frames of an image (e.g., from the image sensor 256 or the database 242);

image sharpening module 222 for sharpening a respective frame (or an image);

frame selection module 224 for selecting particular frame(s) out of multiple frames of an image;

aligning module 226 for aligning multiple frames of an image;

fusion module 228 for combining multiple frames of an image (into a single frame image), which may include one or more of the following:

weight determination module 230 configured for determining weights for combining the multiple frames of an image; and weighted sum module 232 configured for combining the multiple frames of an image based on the determined weights;

upscaling module 234 configured for increasing resolution of an image, which may include the following:

adaptive anisotropic triangular kernel module 236 configured for providing an estimated color component for a respective pixel in the increased resolution image; and display module 238 configured for presenting one or more images (e.g., multi-frame images 244 and/or processed images 246 on the user interface 254).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various implementations. Furthermore, memory 206 may store additional modules and data structures not described above. For example, the memory 206 may store instructions for storing the processed images into database 242.

Notwithstanding the discrete blocks in FIG. 2, these figures are intended to be a functional description of some implementations, although, in some implementations, the discrete blocks in FIG. 2 can be a structural description of functional elements in the implementations. One of ordinary skill in the art will recognize that an actual implementation might have the functional elements grouped or split among various components. In practice, and as recognized by those of ordinary skill in the art, items shown separately could be combined and some items could be separated. For example, in some implementations, the weight determination module 230 and the weighted sum module 232 may be implemented in a single module. In some implementations, memory 206 may store a subset of the modules and data structures identified above. In other implementations, fusion module 228 and upscaling module 234 may be implemented as separate applications. In some implementations, one or more programs, modules, or instructions may be implemented in peripheral controller 252 (e.g., the peripheral controller 252 may be an integrated circuit dedicated to process images from the image sensor 256).

Figure 3:
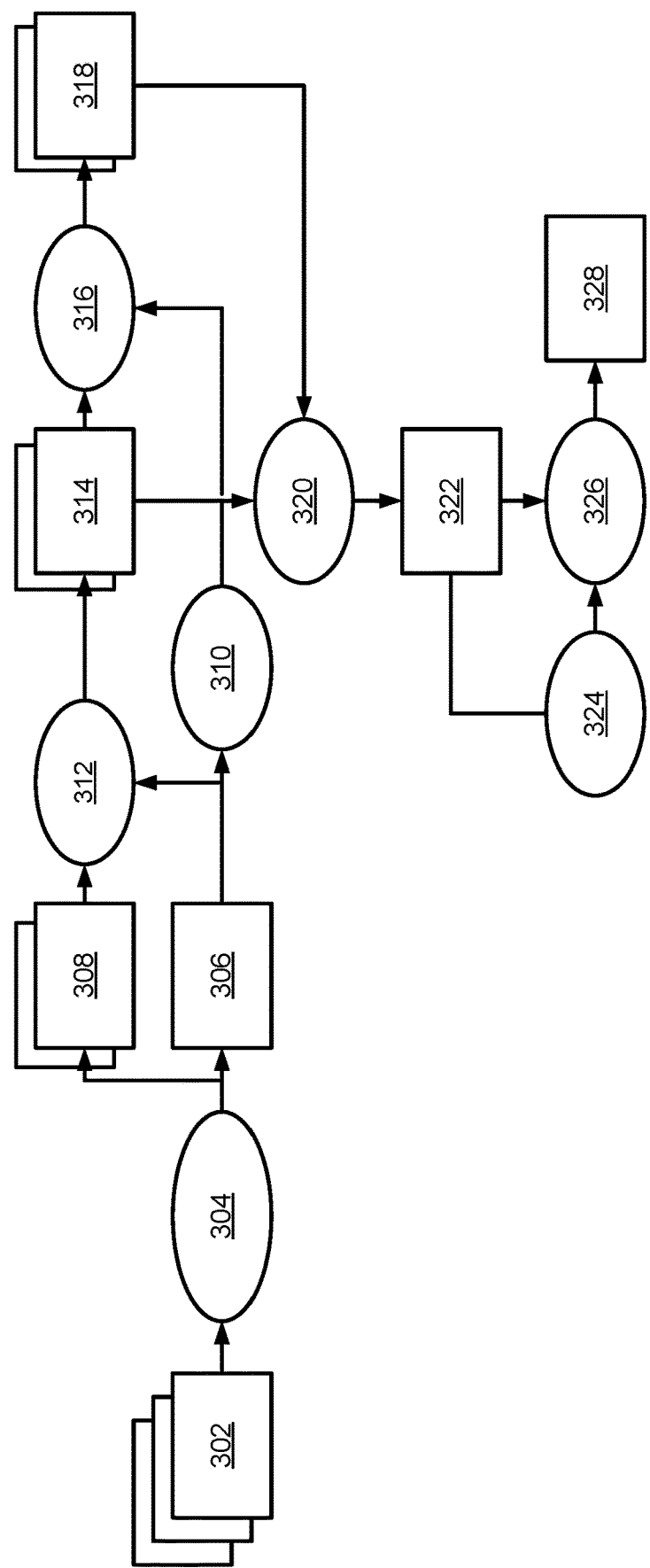
FIG. 3 is a block diagram illustrating an image processing pipeline in accordance with some implementations.

FIG. 3 is a block diagram illustrating an image processing pipeline in accordance with some implementations.

In FIG. 3, multiple frames 302 of an image are provided for image sharpening and frame selection (304). In some implementations, the multiple frames 302 are sharpened prior to the frame selection. Sharpening the multiple frames 302 boosts high frequency components which may have been weakened in an image signal processing (ISP) pipeline (e.g., due to denoising process). In some implementations, a linear sharpening filter, a median sharpening filter, a bilateral sharpening filter, a trilateral sharpening filter, a non-local means sharpening filter, or an edge preserving decomposition is used for sharpening the multiple frames 302. In some implementations, each frame of the multiple frames 302 is sharpened separately (e.g., in series or in parallel). In some implementations, two or more frames of the multiple frames 302 are sharpened collectively. After sharpening, main frame(s) 306 and reference frames 308 are selected from the sharpened multiple frames. In some implementations, a frame with a highest sharpness is selected as a main frame 306 and the rest of the frames are selected as reference frames 308. In some implementations, a first frame in time in the multiple frames 302 is selected as the main frame 306 and the rest of the frames are selected as reference frames 308. In some implementations, a last frame in time in the multiple frames 302 is selected as the main frame 306 and the rest of the frames are selected as reference frames 308. In some implementations, a middle frame in time in the multiple frames 302 is selected as the main frame 306 and the rest of the frames are selected as reference frames 308. The main frame 306 may serve as a basis for aligning the reference frames 308 (e.g., the reference frames 308 are aligned to the main frame 306), and/or as a basis for determining fusion weights (e.g., the weights for reference frames 308 are determined in comparison to the main frame 306).

In some implementations, the reference frames 308 are aligned (312) with the main frame 306. In some implementations, the reference frames 308 are aligned with the main frame 306 utilizing sub-pixel information, which improves the alignment accuracy to the sub-pixel level. In some implementations, the reference frames 308 are also upscaled (e.g., the resolution of the reference frames 308 is increased) to provide the aligned and upscaled reference frames 314. In some implementations, the upscaling factor is greater than 1 (e.g., the resolution of the upscaled image is greater than the resolution of the image before upscaling). For example, the upscaling may receive an image having 1920×1080 resolution and provide an image having 3840×2160 resolution. The scaling factor may be determined based on a noise level in the image, a blur caused by the image signal processor, and a computational balance with anisotropic-kernel-based up-sampling. In some implementations, the upscaling is applied to the reference frames 308 after aligning the reference frames 308 with the main frame. In some implementations, the upscaling is applied to the reference frames 308 before aligning the reference frames 308 with the main frame.

In some implementations, the main frame 306 is also upscaled (310). In some implementations, the upscaling is applied to the main frame 306 after aligning the reference frames 308 with the main frame 306. In some implementations, the upscaling is applied to the main frame 306 before aligning the reference frames 308 with the main frame 306. In some implementations, the main frame 306 and the reference frames 308 are upscaled with a same upscaling factor.

These operations boost high frequency components of the multiple-frame image, which aids subsequent fusion operations and improves contrast of weak high frequency details in the image.

In some implementations, the aligned and upscaled reference frames 314 and the upscaled main frame are provided for (316) determining fusion weights 318. The fusion weights are used as weights in combining the (aligned and upscaled) reference frames 314 with the (upscaled) main frame. In some implementations, the fusion weights are determined for a respective reference frame of the reference frames by comparing the main frame and the respective reference frame (e.g., the fusion weights for a first reference frame are determined by comparing the main frame and the first reference frame and the fusion weights for a second reference frame are determined by comparing the main frame and the second reference frame). The operations for determining the fusion weights (e.g., motion detection) are described further with respect to FIG. 4.

In some implementations, the (aligned and upscaled) reference frames 314, the (upscaled) main frame, and the fusion weights 318 are used to (320) obtain a combined image 322 (e.g., a weighted combination of the main frame and the reference frames based on the fusion weights). The operations for obtaining the combined image 322 are described further with respect to FIG. 5.

In some implementations, the combined image 322 is further upscaled (326) to provide an output image. The two-step upscaling (first upscaling in operations 310 and 312 and second upscaling in operation 326) reduce the memory usage and computational complexity, leading to fast and efficient operations. In some implementations, an adaptive anisotropic triangular kernel is used (324) for the upscaling. The upscaling operation is described further with respect to FIG. 6.

There are certain advantages in fusing multiple frames into a single frame and then upscaling the single frame instead of jointly fusing-and-upscaling the multiple frames. For example, in configurations where the image signal processor has already processed the multiple frames with operations, such as demosaicing, denoising and other non-linear processes, such operations have changed and spread out the subpixel information contained in the raw data, and the original YUV data in reference frames becomes less relevant. In another example, fusing multiple frames into an intermediate size before performing the computationally-expensive full-size upscaling significantly reduces processing time.

Although multi-frame fusion provides some denoising effect as a byproduct due to multi-pixels fusion in temporal-spatial domain, the denoising effect of the multi-frame fusion may not be sufficient compared with dedicated denoising operation. By utilizing the local gradient information generated in adaptive kernel calculation as guidance, dedicated adaptive denoising can be performed simultaneously in upscaling stage. In some implementations, non-local means denoising method may be used for large gradient regions whereas simple and fast denoising method like Gaussian filter can be used in small gradient regions. Hierarchical method may be used to further improve the denoising capability against low frequency noises.

Figure 4:
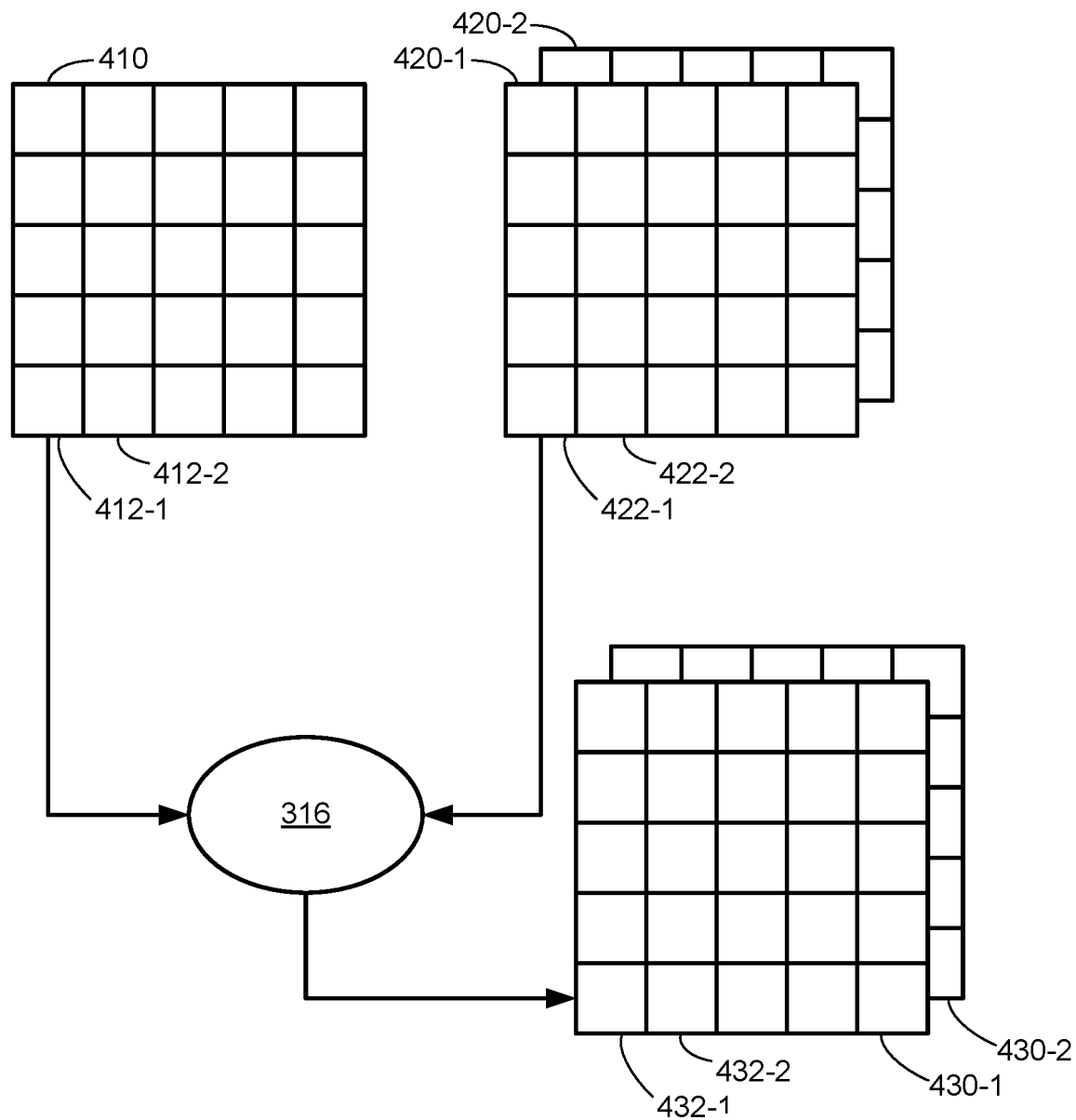
FIG. 4 is a schematic diagram illustrating a motion detection operation in accordance with some implementations.

FIG. 4 is a schematic diagram illustrating a motion detection operation in accordance with some implementations.

In FIG. 4, the motion detection operation includes comparing the main frame 410 and the reference frames 420 (e.g., 420-1 and 420-2) to determine fusion weights. In some implementations, the motion detection operation compares each pixel of a reference frame with a corresponding pixel of the main frame to determine a fusion weight for the pixel of the reference frame (e.g., comparing pixel 412-1 of the main frame 410 with pixel 422-1 of the reference frame 420-1 to determine a weight for the pixel 422-1 of the reference frame 420-1, comparing pixel 412-2 of the main frame 410 with pixel 422-2 of the reference frame 420-1 to determine a weight for the pixel 422-2 of the reference frame 420-1, etc.). In some implementations, comparing a pixel of a reference frame with a corresponding pixel of the main frame includes comparing one or more intensities (e.g., in one or more color channels) of the pixel of the reference frame with one or more intensities (e.g., in one or more corresponding color channels) of the corresponding pixel of the main frame. For example, a pixel may store color intensities of red, green, and blue components (or YUV components, etc.). In some implementations, two or more components are used for comparison. In some implementations, only one component (e.g., luma Y) is used for comparison. In some implementations, in accordance with a determination that a pixel of the reference frame matches with a corresponding pixel of the main frame, a weight value of 1 is assigned for the pixel of the reference frame. In some implementations, in accordance with a determination that a pixel of the reference frame does match with a corresponding pixel of the main frame, a weight value other than 1 (e.g., 0) is assigned for the pixel of the reference frame.

In some implementations, the weights are reflected in weight images 430 (e.g., weight image 430-1 corresponding to the reference frame 420-1 and weight image 430-2 corresponding to the reference frame 420-2, etc.). In some implementations, a weight image (e.g., 430-1) stores the weight values (e.g., pixel 432-1 of the weight image 430-1 stores a weight value $w_1$ determined by comparing the pixel 412-1 and the pixel 422-1). In some implementations, a weight image (e.g., 430-1) stores the weight values. In some implementations, the weight image stores a Hadamard product of the weight values and the reference frame (e.g., pixel 432-1 of the weight image 430-1 stores a product of (i) the pixel 422-1 and (ii) a weight value $w_1$ determined by comparing (ii-1) the pixel 412-1 and (ii-2) the pixel 422-1). In some implementations, although the weight value $w_1$ is determined by comparison of a single channel (e.g., luma Y), the weight value w1 is applied to all color components (e.g., YUV).

Figure 5:
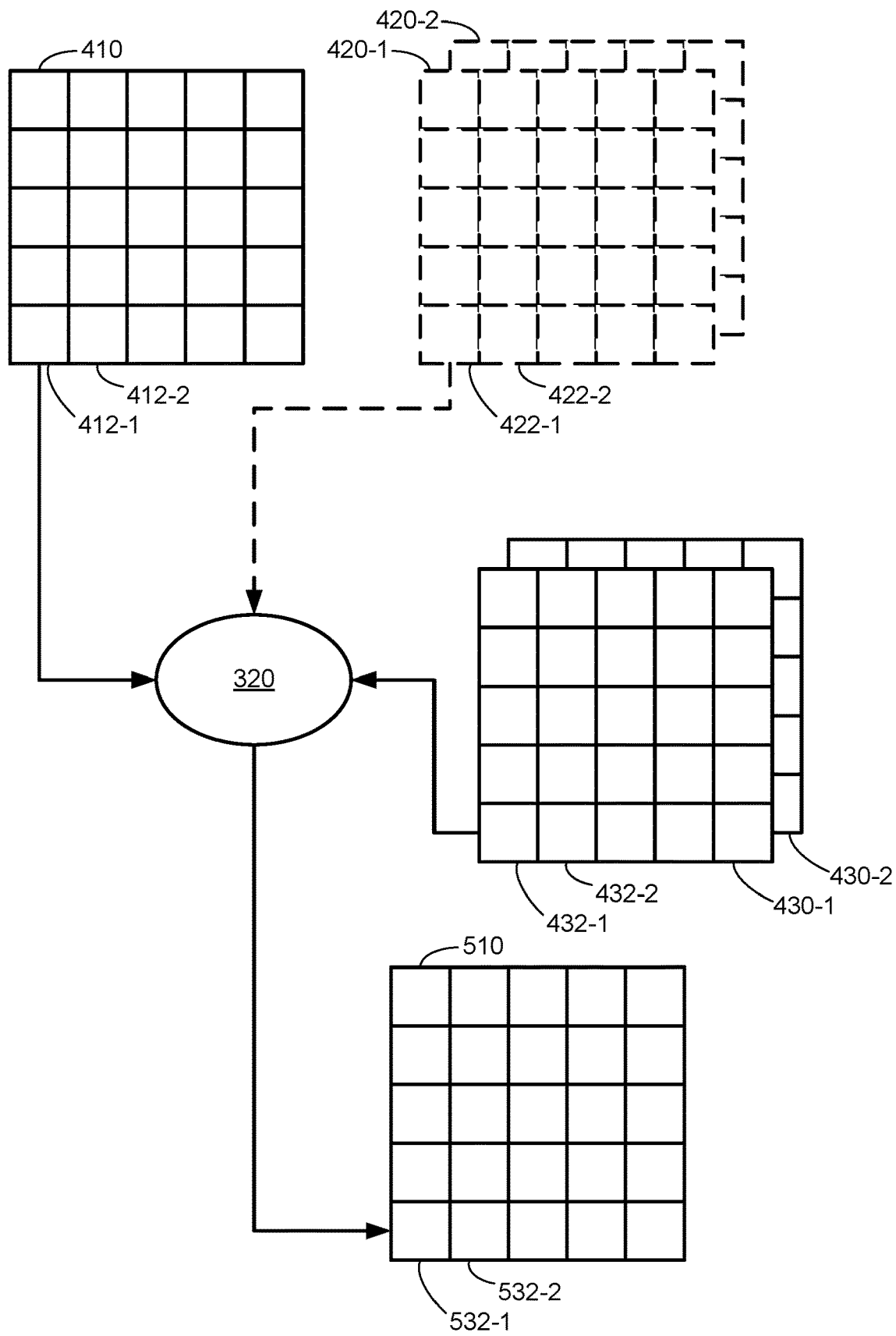
FIG. 5 is a schematic diagram illustrating a fusion operation in accordance with some implementations.

FIG. 5 is a schematic diagram illustrating a fusion operation in accordance with some implementations.

In FIG. 5, the fusion operation includes combining the main frame 410 with the reference frames 420.

When the weight images 430 store Hadamard products of the weight values and the reference frames 420, the fusion operation includes adding the weight images 430 to the main frame 410 (e.g., a pixel 532-1 of the combined image 510 is a sum of the pixel 412-1 of the main frame 410, the pixel 432-1 of the weight image 430-1, and a corresponding pixel of the weight image 430-2, and a pixel 532-2 of the combined image 510 is a sum of the pixel 412-2 of the main frame 410, the pixel 432-2 of the weight image 430-1, and a corresponding pixel of the weight image 430-2).

When the weight images 430 are weight values, the fusion operation includes obtaining the Hadamard products of the weight values in the weight images 430 and the reference frames 420, and adding the obtained Hadamard products to the main frame 410 (e.g., the pixel 532-1 of the combined image 510 is a sum of (i) the pixel 412-1 of the main frame 410 and (ii) a sum of (ii-1) a product of (ii-1-a) the pixel 422-1 of the reference frame 420-1 and (ii-1-b) the weight value 432-1 in the weight image 430-1 and (ii-2) a product of (ii-2-a) a corresponding pixel of the reference frame 420-2 and (ii-2-b) a weight value at a corresponding location in the weight image 430-2, and the pixel 532-2 of the combined image 510 is a sum of (i) the pixel 412-2 of the main frame 410 and (ii) a sum of (ii-1) a product of (ii-1-a) the pixel 422-2 of the reference frame 420-1 and (ii-1-b) the weight value 432-2 in the weight image 430-1 and (ii-2) a product of (ii-2-a) a corresponding pixel of the reference frame 420-2 and (ii-2-b) a weight value at a corresponding location in the weight image 430-2).

In some embodiments, the fusion output is obtained utilizing the following operations:

The fusion output=(main×1.0+reference_1× weight_1+ . . . +reference_n×weight_n)/(1.0+ weight_1+ . . . +weight_n)

Although FIGS. 4 and 5 describe the motion detection and fusion operations based on pixel-level operations, in some implementations, patch-based operations are used (e.g., performing a motion detection and/or fusion on a group of pixels, such as 2×2 pixels, 3×3 pixels, 4×4 pixels, 5×5 pixels, etc.).

Such fusion operation based on the weight images allowed recovery of high frequency details and noise reduction, while avoiding ghost artifacts, which further improved the performance of anisotropic triangular kernel calculation.

Figure 6:
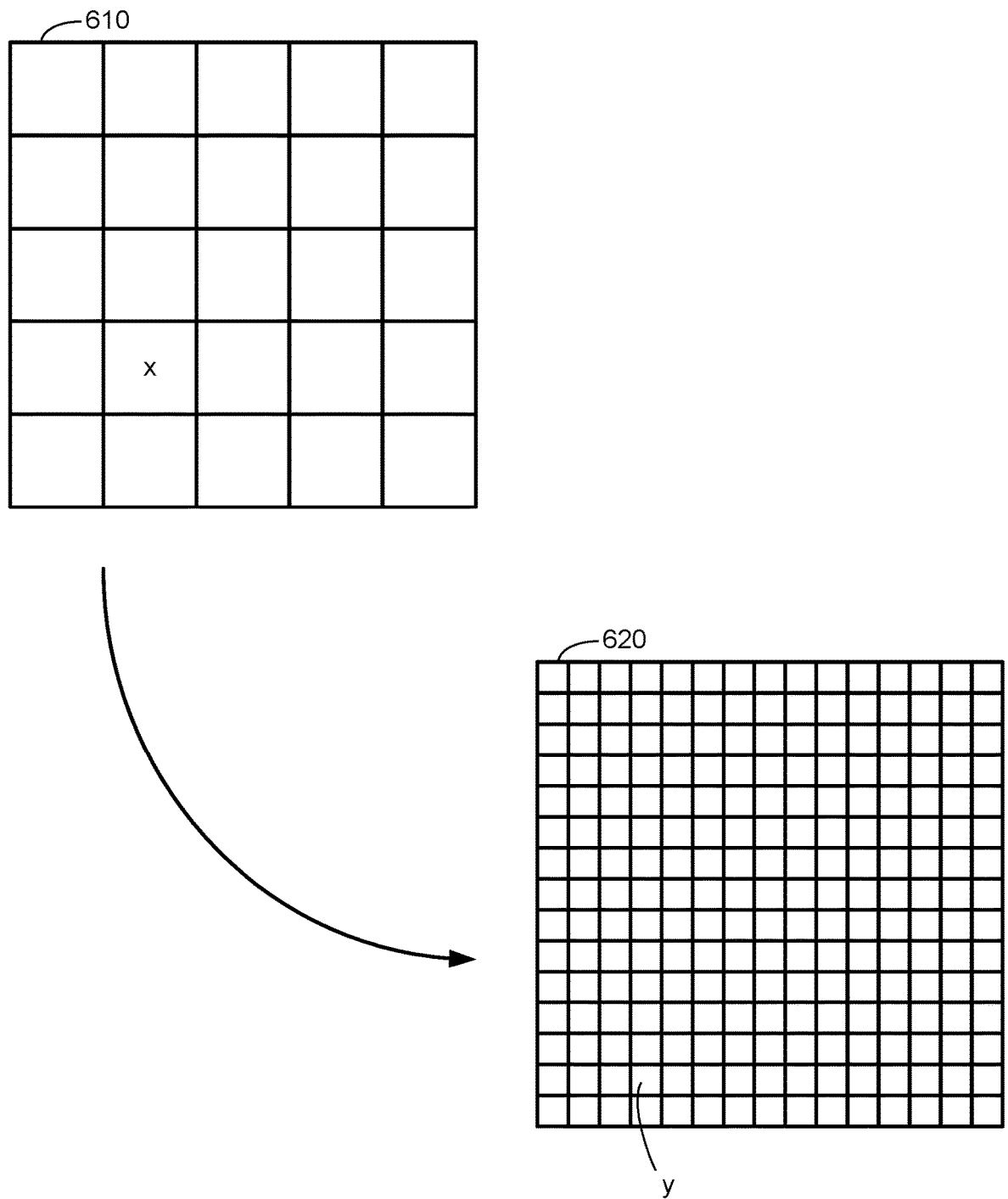
FIG. 6 is a schematic diagram illustrating an upscaling operation in accordance with some implementations.

FIG. 6 is a schematic diagram illustrating an upscaling operation in accordance with some implementations.

In FIG. 6, a patch of an image 610 having 5×5 resolution is upscaled to provide a patch of a corresponding image 620 having 15×15 resolution. In some implementations, nearest-neighbor interpolation, bilinear interpolation, bicubic interpolation, sinc resampling, Lanczos resampling, box sampling, mipmap, Fourier-transform methods, edge-directed interpolation, pixel-art scaling, vectorization, or deep convolutional neural networks are used for upscaling.

In some implementations, adaptive anisotropic triangular kernel is used for upscaling. In adaptive anisotropic triangular kernel, local gradient information for each pixel location is estimated by performing structure tensor analysis of gradients. In some implementations, the gradients are computed in a window having a predefined size (e.g., 3×3, 5×5, 7×7 pixels, etc.) centered in the target location. In some implementations, the gradients are computed based on the Y component of the combined image, which has improved signal-to-noise ratio and provided more accurate upscaling result. Eigen-analysis of the local structure tensor provides gradient information of local strength and direction. The direction with dominant eigenvalue indicates main gradient direction and the orthogonal one represents edge direction. The weight of a pixel x (in the image before upscaling, such as the combined image from the fusion operation) to the output pixel y (in the upscaled image) can be calculated through a triangular kernel as:

$$W_{x,y} = \max(0, 1 - d_{xy} H d_{xy}^T) \quad (1)$$

where $d_{xy}$ is the distance vector between position x and y and H is the distance modification matrix which modifies the physical distance adaptively according to local gradient structure. H is constructed as:

$$H = [e_1, e_2] \begin{bmatrix} k_1 & 0 \\ 0 & k_2 \end{bmatrix} \begin{bmatrix} e_1 \\ e_2 \end{bmatrix} \quad (2)$$

where $e_1$ and $e_2$ representing the main gradient and its perpendicular directions come from the eigen-analysis of the local gradient tensor structure. The parameters $k_1$ and $k_2$ scale the corresponding projected distances and are controlled by the eigen-analyzed local gradient strengths. In some implementations, the distance modification matrix H is obtained by performing the eigen-analysis of the pre-upscaling image (e.g., the image 610) and the obtained distance modification matrix H is used to determine the weight $W_{x,y}$ of a pixel x to the output pixel y.

In some implementations, after obtaining the weight $W_{x,y}$, the intensity of pixel y in the image 620 is determined by summing product of the intensity of each pixel x in the image 610 and corresponding weights $W_{x,y}$.

Since this triangular kernel gives decreasing weights as effective distance grows, the shape of the anisotropic kernel is adjusted for enlarging distance along gradient direction and reducing distance along edge direction. Such triangular kernel can keep a sharp gradient and at the same time smooth a noisy edge. Another benefit brought by the triangular kernel is computational simplicity compared with its Gaussian counterpart.

Figure 7:
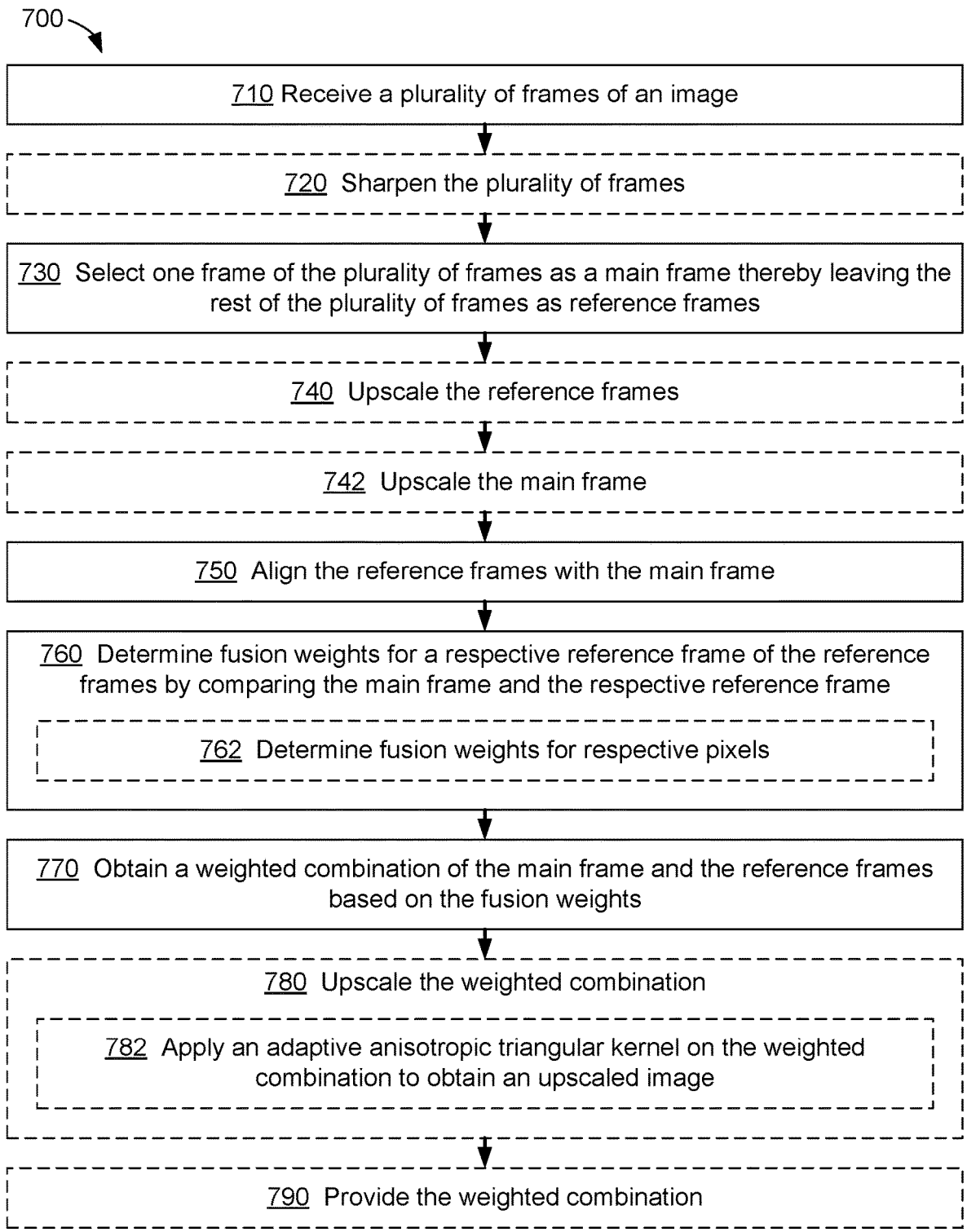
FIG. 7 is a flow diagram illustrating a method for image processing in accordance with some implementations.

FIG. 7 is a flow diagram illustrating a method 700 for processing a multi-frame image in accordance with some implementations. In some implementations, the method 700 is performed by an electronic device (e.g., the electronic device 200) with one or more processors and memory.

The method includes (710) receiving a plurality of frames of an image (e.g., multiple frames 302 of an image).

In some implementations, the method also includes (720) sharpening the plurality of frames prior to selecting the one frame (e.g., sharpening in operation 304).

The method includes (730) selecting one frame of the plurality of frames as a main frame thereby leaving the rest of the plurality of frames as reference frames (e.g., selection in operation 304).

In some implementations, the method also includes (720) sharpening the plurality of frames after selecting the one frame.

In some implementations, the method also includes (740) upscaling the reference frames (e.g., upscaling in operation 312).

In some implementations, the method also includes (742) upscaling the main frame (e.g., operation 310).

The method includes (750) aligning the reference frames with the main frame (e.g., aligning in operation 312).

The method includes (760) determining fusion weights for a respective reference frame of the reference frames by comparing the main frame and the respective reference frame (e.g., operation 316).

In some implementations, determining the fusion weights for the respective reference frame includes (762) determining fusion weights for respective pixels (e.g., FIG. 4).

The method includes (770) obtaining a weighted combination of the main frame and the reference frames based on the fusion weights (e.g., operation 320 and FIG. 5).

In some implementations, the method also includes (780) upscaling the weighted combination (e.g., operation 326).

In some implementations, upscaling the weighted combination includes (782) applying an adaptive anisotropic triangular kernel on the weighted combination to obtain an upscaled image (e.g., operation 324).

In some implementations, the method also includes (790) providing the weighted combination (e.g., displaying the combined image on a display, storing the combined image, or providing the combined image to another device).

It will also be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the various described implementations. The first image and the second image are both images, but they are not the same image.

The terminology used in the description of the implementations herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "exemplary" means "serving as an example," and does not necessarily indicate preference or superiority over other possible examples or implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the various described implementations and their practical applications, to thereby enable others skilled in the art to best utilize the invention and various described implementations with various modifications as are suited to the particular use contemplated.

What is claimed is:

1. A method, comprising:
   at an electronic device with one or more processors and memory:
      receiving a plurality of frames of an image;
      selecting one frame of the plurality of frames as a main frame thereby leaving the rest of the plurality of frames as reference frames;
      aligning the reference frames with the main frame;
      determining fusion weights for a respective reference frame of the reference frames by comparing the main frame and the respective reference frame; and
      obtaining a weighted combination of the main frame and the reference frames based on the fusion weights.

2. The method of claim 1, further comprising:
   sharpening the plurality of frames prior to selecting the one frame.

3. The method of claim 1, further comprising:
   upscaling the reference frames.

4. The method of claim 1, further comprising:
   upscaling the main frame.

5. The method of claim 1, wherein:
   determining the fusion weights for the respective reference frame includes determining fusion weights for respective pixels.

6. The method of claim 1, further comprising:
   upscaling the weighted combination.

7. The method of claim 6, further comprising:
   upscaling the weighted combination includes applying an adaptive anisotropic triangular kernel on the weighted combination to obtain an upscaled image.

8. An electronic device, comprising:
   one or more processors; and
   memory storing instructions, which, when executed by the one or more processors, cause the one or more processors to:
      receive a plurality of frames of an image;
      select one frame of the plurality of frames as a main frame thereby leaving the rest of the plurality of frames as reference frames;
      align the reference frames with the main frame;
      determine fusion weights for a respective reference frame of the reference frames by comparing the main frame and the respective reference frame; and
      obtain a weighted combination of the main frame and the reference frames based on the fusion weights.

9. The electronic device of claim 8, wherein the stored instructions, when executed by the one or more processors, also cause the one or more processors to:
   sharpen the plurality of frames prior to selecting the one frame.

10. The electronic device of claim 8, wherein the stored instructions, when executed by the one or more processors, also cause the one or more processors to:
    upscale the reference frames.

11. The electronic device of claim 8, further comprising:
    upscale the main frame.

12. The electronic device of claim 8, wherein:
    determining the fusion weights for the respective reference frame includes determining fusion weights for respective pixels.

13. The electronic device of claim 8, wherein the stored instructions, when executed by the one or more processors, also cause the one or more processors to:
    upscale the weighted combination.

14. The electronic device of claim 13, wherein:
    upscaling the weighted combination includes applying an adaptive anisotropic triangular kernel on the weighted combination to obtain an upscaled image.

15. A non-transitory computer readable storage medium storing one or more programs for execution by one or more processors of an electronic device, the one or more programs including instructions for:
    receiving a plurality of frames of an image;
    selecting one frame of the plurality of frames as a main frame thereby leaving the rest of the plurality of frames as reference frames;
    aligning the reference frames with the main frame;
    determining fusion weights for a respective reference frame of the reference frames by comparing the main frame and the respective reference frame; and
    obtaining a weighted combination of the main frame and the reference frames based on the fusion weights.

16. The non-transitory computer readable storage medium of claim 15, further comprising:
    sharpening the plurality of frames prior to selecting the one frame.

17. The non-transitory computer readable storage medium of claim 15, further comprising:
    upscaling the reference frames.

18. The non-transitory computer readable storage medium of claim 15, further comprising:
   upscaling the main frame.

19. The non-transitory computer readable storage medium of claim 15, wherein:
   determining the fusion weights for the respective reference frame includes determining fusion weights for respective pixels.

20. The non-transitory computer readable storage medium of claim 15, further comprising:
   upscaling the weighted combination.

\* \* \* \* \*